UNITED STATES PATENT OFFICE.

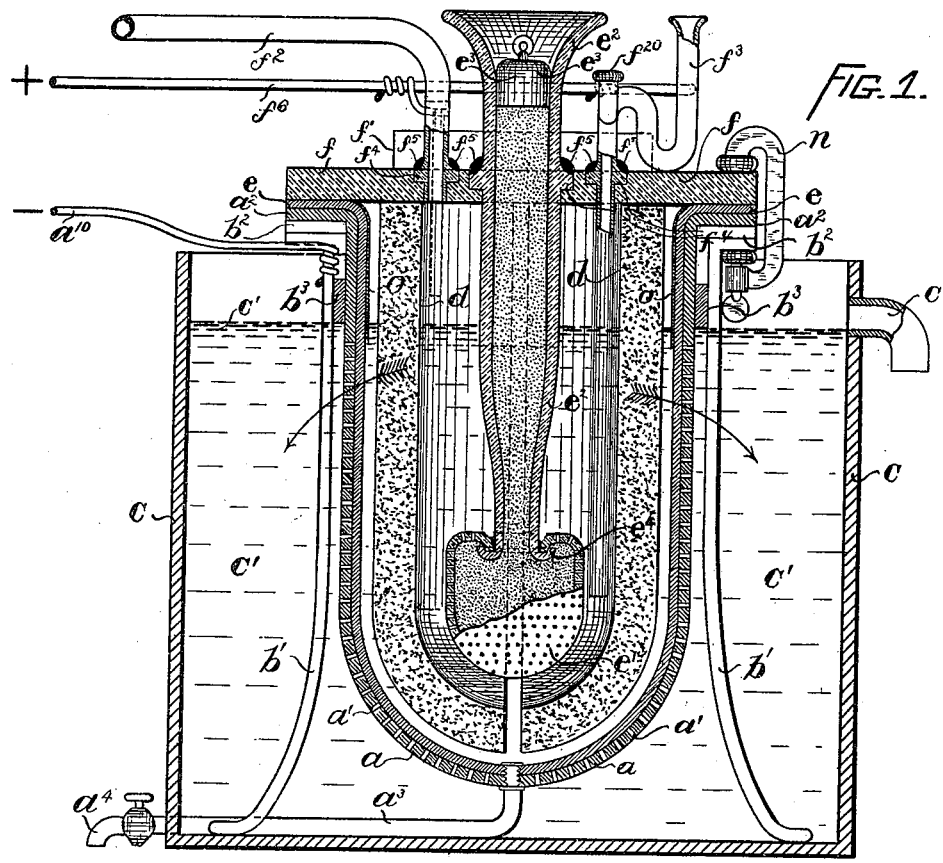
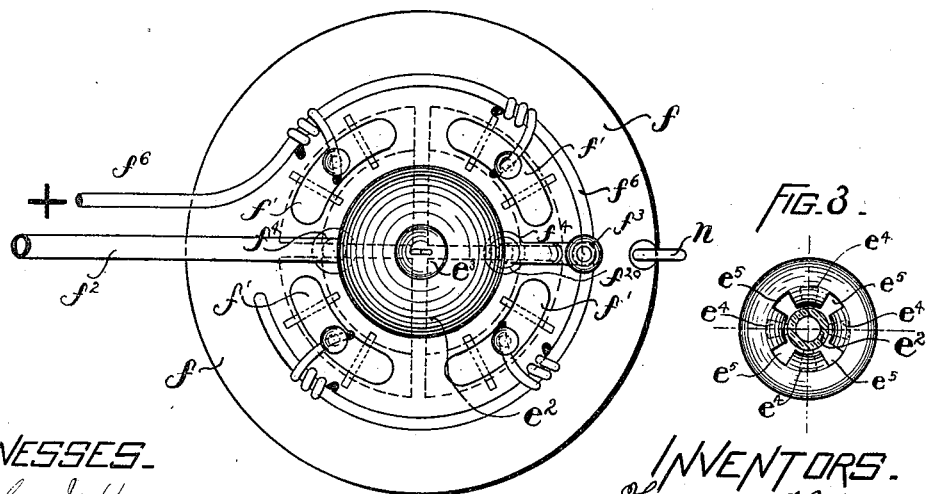

DANIEL N. HATHORNE AND HARRY E. HOBSON, OF RUMFORD FALLS, MAINE, ASSIGNORS OF ONE-FOURTH TO EMMA A. HOBSON, OF SOMERSWORTH, NEW HAMPSHIRE.

APPARATUS FOR DECOMPOSING SOLUTIONS.

SPECIFICATION forming part of Letters Patent No. 666,221, dated January 15, 1901.

Application filed January 11, 1900. Serial No. 1,067. (No model.)

*To all whom it may concern:*

Be it known that we, DANIEL N. HATHORNE and HARRY E. HOBSON, citizens of the United States of America, and residents of Rumford Falls, Oxford county, Maine, have invented certain new and useful Improvements in Apparatus for Decomposing Solutions, of which the following is a specification.

This invention has for its object to improve the construction of an apparatus for the decomposition of solutions by the action of electricity—such, for example, as the decomposition of a saturated solution of chlorid of sodium (common salt) for the production of chlorin gas and sodium hydrate, (caustic soda.)

The improvements consist in a simple and compact arrangement of the parts, such that a high efficiency of the apparatus is obtained, and whereby a small amount of vitreous and metallic material is used in its construction, thus producing an efficient apparatus of relatively small cost and weight.

The invention further consists in an arrangement of the anode and cathode compartments and diaphragm separating them whereby a large diaphragm-surface is presented between said compartments, improvements in the construction of the diaphragm whereby leaks between said anode and cathode compartments are prevented, and a novel construction and arrangement of a receptacle or chamber for containing substance for saturating the solution whereby said substance may be renewed from time to time as it is used up and complete saturation of the solution maintained.

In accordance with this invention the apparatus consists of an outer metallic vessel or shell forming the body of the apparatus and adapted to contain the solution to be decomposed. Said metallic vessel is provided with openings or perforations through its side walls and bottom and is constructed and arranged to form a negative electrode or continuous cathode of the apparatus of large surface. The positive electrode or anode is inclosed within said metallic vessel and surrounded by said negative electrode and is arranged to extend into said solution to be decomposed. A diaphragm of fibrous material is interposed between said positive and negative electrodes, covering the inside surface of said perforated metallic vessel and presenting a large surface to the action of said solution. An insulating-cover closes the upper end of said metallic vessel and is adapted to support said positive electrode, and a receptacle or chamber for substance for saturating the solution to be decomposed is provided and suspended in said solution, having a tube through which said substance may be renewed extending up through said insulating-cover. A space is provided in said metallic vessel between the surface of said solution and the cover thereof for the collection of gas liberated as said solution is decomposed, and a pipe through said cover conducts said gas to a suitable holder. Means are provided for renewing liquid to the solution, and an opening is provided through said insulating-cover for inserting instruments for ascertaining the temperature, density, and level of solution contained in said metallic vessel. A valve is arranged at the bottom of said vessel for emptying its contents and washing out its interior.

The body of said apparatus is supported in a tank containing liquid in which the soluble products of decomposition dissolve and are collected after passing through said diaphragm and perforations in said metallic vessel, and means are provided for removing said solution from said tank and keeping the liquid therein below the point of saturation.

Figure 1 of the drawings is a side elevation in section of an apparatus for the decomposition of solutions embodying this invention; and Fig. 2 is a plan view of the cover to the metallic vessel, showing electrical connections of the positive electrode or anode.

The letter $a$ represents a vessel adapted to hold the solution to be decomposed, forming the body of the apparatus, consisting of a thin metallic shell, preferably of circular cross-section and having a hemispherical or convex bottom. Said vessel $a$ is connected with a negative wire $a^{10}$ and is constructed and arranged to form the negative electrode or cathode of the apparatus and is provided with openings or perforations $a'$ through its side walls and bottom, arranged close together around its entire surface to within a short distance of the upper end thereof. An annular flange $a^2$ is formed around the upper end of said metallic vessel $a$, which is adapted to support said vessel $a$ within a light skeleton framework consisting of an annular ring $b^2$, passing around said vessel $a$ and engaging said flange $a^2$ thereof, and a band or ring $b^3$, arranged below said flange portion $a^2$ of said vessel $a$, passing around the body thereof. Suitable legs $b'$ are provided and attached to said annular ring $b^2$ and band $b^3$ to support said vessel $a$ above the bottom of a tank $c$, to be described, as shown in Fig. 1 of the drawings. Said metallic vessel $a$ is arranged in said tank $c$, containing liquid $c'$, and is supported in its framework above the bottom of said tank $c$, said liquid $c'$ contained therein rising to a level a little above the perforations $a'$ in said vessel $a$. Said tank $c$ is provided with an overflow-pipe $c^2$, arranged to maintain said liquid $c'$ in said tank $c$ at a predetermined level. A pipe $a^3$, having a valve $a^4$, is connected with the bottom of said vessel $a$ and passes through said tank $c$ to the outside thereof for emptying the contents of said vessel $a$ and washing out its interior. The positive electrode or anode $d$ of the apparatus is contained within said metallic vessel $a$ and is arranged substantially concentric with the inside surface thereof to form a narrow annular space between itself and the side walls thereof, presenting a large area to the action of the solution contained in said vessel $a$. Said positive electrode $d$ is preferably formed of carbon segments arranged with small spaces between them and coming nearly together at the lower end of said vessel $a$ and forming a central chamber, in which a receptacle $e'$ for saturating the liquid is suspended, to be described, an arrangement of said carbon in four segments being shown in Fig. 2 of the drawings by dotted lines. Between said metallic vessel $a$, forming the negative electrode or cathode of the apparatus, and the positive electrode or anode $d$ a diaphragm $e$ is interposed, which may be made of a fibrous material, preferably asbestos, forming a lining to the metallic vessel $a$, covering the perforations therein and arranged to closely fit the inside surface thereof, as shown in Fig. 1.

A cover $f$, of vitreous or other suitable insulating material, is provided for the metallic vessel $a$, which may be made gas-tight by clamps $n$ pressing said cover against said flange portion $a^2$ of said vessel $a$ or in any other suitable way, and said cover $f$ is adapted to support said carbons $d$, forming the positive electrode or anode of the apparatus. Said carbons $d$ have portions $f'$, which are adapted to pass up through apertures in said cover $f$ and connect with a positive wire $f^6$, as shown in Fig. 1 of the drawings. A pipe $f^2$ passes through said cover $f$ and communicates with the interior of said vessel $a$ and is arranged to conduct away gas to a suitable gas-holder, and a pipe $f^3$, having a trap, also passes through said cover $f$ and down into the solution contained in said vessel $a$, said pipe $f^3$ having an extension $f^{20}$, which is used to supply liquid to said vessel $a$. Said pipes $f^2$ and $f^3$ will be preferably provided with flanges $f^4$ $f^4$, fitting into shouldered holes in said cover $f$, and rings of cement $f^5$ may be employed to obtain gas-tight joints.

A receptacle or chamber $e'$ is provided for containing the substance for saturating the solution to be decomposed, and said chamber $e'$ may be bulb-shaped and adapted to be suspended in the solution contained in said metallic vessel $a$ and arranged substantially in the middle thereof and surrounded by liquid on all sides. Said chamber $e'$ is preferably made of vitreous material—such, for example, as burnt clay or like material—and is perforated to allow its contents to dissolve in said liquid. A feeding-tube $e^2$ is arranged to communicate with said chamber $e'$, extending up through said cover $f$, having a bell-shaped mouth closed by a stop-cock $e^3$. Said feeding-tube $e^2$ is provided with a flange and is rigidly secured to said cover $f$ by a gas-tight joint and is constructed and arranged to support said chamber $e'$ at its lower end. In order that said cover $f$, feeding-tube $e^2$, and chamber $e'$ may be made in separate parts, said chamber $e'$ may be detachably suspended at the lower end of said feeding-tube $e^2$ by any well-known or suitable fastening; but I have in the drawings shown said feeding-tube $e^2$ to be provided at its lower end with projections $e^4$, arranged around the outside thereof and adapted to enter slots $e^5$, cut in the sides of a circular opening formed in the upper end of said chamber $e'$, so that by slightly turning said chamber $e'$ axially said projections $e^4$ will engage and lock with depressions formed in said chamber $e'$, forming what is commonly called a "bayonet-joint."

The operation of the apparatus is as follows, it being designed to decompose a solution of chlorid of sodium (common salt) for the production of chlorin gas and sodium hydrate, (caustic soda:) The tank $c$ is filled with water to a level a little above the perforations $a'$ in said vessel $a$, arranged therein, the overflow-pipe $c^2$ being arranged to maintain the liquid at such level. A strong solution of salt and water is introduced into said metallic vessel $a$, preferably filling it to the same level as that of the liquid $c'$ in said tank $c$, the receptacle for salt $e'$ being completely covered by said solution and filled with salt through the feeding-tube $e^2$ to keep the solution completely saturated. A suitable current of electricity is provided and conducted to the apparatus through wires $a^{10}$ and $f^6$, the positive wire $f^6$ being connected to said carbon anode $d$ and the negative wire $a^{10}$ being connected to the metallic vessel $a$, forming the cathode of the apparatus. Decomposition of the solution of salt and water takes place. Chlorin is disengaged from the solution at the anode $d$, rising into the space between the surface of the solution and the cover of the vessel $a$, from which it passes through said pipe $f^2$ to a suitable gas-holder. At the cathode of the apparatus formed by the metallic vessel $a$ and upon the side of the diaphragm $e$, next the surface thereof, sodium hydrate is formed and hydrogen liberated, said sodium hydrate dissolving in the liquid contained in the tank $c$ and the hydrogen rising up through said liquid to the surface thereof, from which it escapes into the air. The sodium hydrate is dissolved in the liquid contained in said tank $c$, which may be removed from time to time and the sodium hydrate separated therefrom by any well-known process. An opening to said vessel is provided through the cover for the insertion of instruments to ascertain the temperature, density, and level of the solution contained in the vessel.

To prevent the chlorin escaping from the surface of the solution from disintegrating the exposed part of the diaphragm $e$ and side walls of the metallic vessel $a$ above the surface of the solution contained therein, said diaphragm $e$ and metallic vessel $a$ may be coated or painted with a substance unacted upon by said gas.

From the construction of the apparatus herein described it is obvious that the parts contained within said metallic vessel $a$ may be easily cleaned by opening the valve $a^4$ in the pipe $a^3$, which enters the bottom of said vessel $a$, and introducing water or other liquid into the interior thereof through the trapped pipe $f^3$, entering through the cover.

We claim—

1. In an apparatus for the decomposition of solutions, a tank, a perforated chamber constituting the cathode, a diaphragm therefor, an outlet-opening through the bottom of the diaphragm and the cathode, a chamber constituting the anode located in said cathode, and electrical connections between said cathode and anode and the source of electrical supply, substantially as described.

2. In an apparatus for the decomposition of solutions, a tank, a perforated chamber constituting the cathode, a diaphragm therefor, an outlet-opening through the bottom of the diaphragm and the cathode, a chamber constituting the anode located in said cathode and provided with openings through its walls, a chamber located in said anode having perforations, and electrical connections between said cathode and anode and the source of electrical supply, substantially as described.

3. In an apparatus for the decomposition of solutions, a tank, a perforated chamber constituting the cathode located in said tank, a chamber constituting the anode located in said cathode and provided with openings through its walls, a tube located in said anode having a bottom wall and provided with numerous perforations at its lower end, and electrical connections between said cathode and anode and the source of electrical supply, substantially as described.

4. In an apparatus for the decomposition of solutions, a tank a perforated chamber constituting the cathode located in said tank, a chamber constituting the anode located in said cathode and provided with openings through its walls, a perforated chamber located in said anode and having a removable bottom, and electrical connections between said cathode and anode and the source of electrical supply, substantially as described.

5. In an apparatus for the decomposition of solutions, a tank a perforated chamber constituting the cathode located in said tank, a chamber constituting the anode located in said cathode and provided with openings through its walls, a chamber located in said anode and having a perforated removable bottom, and electrical connections between said cathode and anode and the source of electrical supply, substantially as described.

6. In an apparatus for the decomposition of solutions, a tank, a perforated chamber constituting the cathode, a chamber constituting the anode formed of sections spaced apart between them and located in said cathode, and electrical connections between said cathode and anode and the source of electrical supply, substantially as described.

7. In an apparatus for the decomposition of solutions, a tank, a perforated chamber constituting the cathode, a chamber constituting the anode formed of sections spaced apart between them and located in said cathode, a chamber located in said anode having perforations, and electrical connections between said cathode and anode and the source of electrical supply, substantially as described.

8. In an apparatus for the decomposition of solutions, a tank, a perforated chamber constituting the cathode, a diaphragm therefor, an outlet-opening through the bottom of the diaphragm and the cathode, a chamber constituting the anode formed of sections having spaces between them and located in said cathode, and electrical connections between said cathode and anode and the source of electrical supply, substantially as described.

9. In an apparatus for the decomposition of solutions, a tank, a perforated chamber constituting the cathode located in said tank, a diaphragm therefor, a chamber constituting the anode located in said cathode and provided with openings through its walls, a tube located in said anode having a bottom wall and provided with numerous perforations at its lower end, and electrical connections between said cathode and anode and the source of electrical supply, substantially as described.

Signed by us at Bangor, Maine, this 4th day of January, 1900.

DANIEL N. HATHORNE.
HARRY E. HOBSON.

Witnesses:
FREELAND JONES,
HARRY O. ROBINSON.